United States Patent [19]
Springer

[11] Patent Number: 5,862,866
[45] Date of Patent: Jan. 26, 1999

[54] DOUBLE WALLED INSULATED TUBING AND METHOD OF INSTALLING SAME

[75] Inventor: Johann Springer, Hanover, Germany

[73] Assignee: Roxwell International Limited, Dubin, Ireland

[21] Appl. No.: 737,669

[22] PCT Filed: May 23, 1995

[86] PCT No.: PCT/EP95/01997

§ 371 Date: Nov. 20, 1996

§ 102(e) Date: Nov. 20, 1996

[87] PCT Pub. No.: WO95/32355

PCT Pub. Date: Nov. 30, 1995

[30] Foreign Application Priority Data

May 25, 1994 [AT] Austria .................................. 1068/94

[51] Int. Cl.$^6$ .............................. E21B 19/16; F16L 11/12
[52] U.S. Cl. ................. 166/380; 166/57; 285/47
[58] Field of Search ................. 166/380, 302, 166/57, 272.3; 285/47

[56] References Cited

U.S. PATENT DOCUMENTS

| | | | |
|---|---|---|---|
| 2,924,245 | 2/1960 | Wilson | 138/64 |
| 3,142,336 | 7/1964 | Doscher | 166/11 |
| 3,160,208 | 12/1964 | Jorda | 166/57 |
| 3,297,100 | 1/1967 | Crews | 175/195 |
| 3,561,531 | 2/1971 | Miller | 166/285 |
| 3,574,357 | 4/1971 | Alexandru | 285/47 |
| 3,608,640 | 9/1971 | Willhite et al. | 166/315 |
| 3,884,512 | 5/1975 | Wesch | 285/133 R |
| 3,945,215 | 3/1976 | Johnson et al. | 285/47 |
| 4,067,596 | 1/1978 | Kellner | 285/133 A |
| 4,130,301 | 12/1978 | Dunham | 285/47 |
| 4,328,858 | 5/1982 | Richter et al. | 165/45 |
| 4,396,211 | 8/1983 | McStravick et al. | 285/47 |
| 4,415,184 | 11/1983 | Stephenson | 285/47 |
| 4,444,420 | 4/1984 | McStravick et al. | 285/47 |
| 4,459,731 | 7/1984 | Hutchison | 285/332.3 X |
| 4,477,106 | 10/1984 | Hutchison | 285/47 |
| 4,526,408 | 7/1985 | Anderson | 285/47 |
| 4,566,495 | 1/1986 | Baker et al. | 285/47 |
| 4,693,313 | 9/1987 | Stephenson | 166/302 |
| 4,790,375 | 12/1988 | Bridges et al. | 166/60 |
| 5,070,597 | 12/1991 | Holt et al. | 285/99 X |
| 5,285,846 | 2/1994 | Mohn | 166/61 |
| 5,535,825 | 7/1996 | Hickerson | 166/302 |

FOREIGN PATENT DOCUMENTS

| | | |
|---|---|---|
| 0138603 | 4/1985 | European Pat. Off. . |
| 1204026 | 9/1970 | United Kingdom . |
| 9115654 | 10/1991 | WIPO . |
| 9119129 | 12/1991 | WIPO . |

*Primary Examiner*—Frank S. Tsay
*Attorney, Agent, or Firm*—Ladas & Parry

[57] ABSTRACT

A double walled insulated tubing string (46) adapted to be hung from a well head (58) has an inner tubing string (21) formed of plural inner tubes and a radially outer tubing string (22) formed of plural outer tubes, the strings being independent of one another apart from axially fixing the strings relative to one another at the top end of the tubing string, although axial fixation may also be provided at the lower end of the tubular strings if desired. An annular insulating gap (30) between the tubing strings (21, 22) is hermetically sealed at both opposing ends and may be evacuated. Inner and outer tubing strings may be run into a well using conventional oil well drilling technology and there is no mechanical connection between the inner and outer tubing strings (21, 22), especially at connections of the respective inner and outer lengths of tube. To maintain the inside of the outer tubing string (22) free from formation liquids before the inner tubing string (21) is run into the well and sealed against the outer string at its lower end, a temporary plug (31) initially closes the lower end of the outer string and is de-activated before liquid can flow through the thermally insulated dual tubing string (46).

21 Claims, 7 Drawing Sheets

DOUBLE WALLED INSULATED TUBING AND METHOD OF INSTALLING SAME

BACKGROUND OF THE INVENTION (1) Field of the Invention

This invention relates to double walled insulated tubing and to a method of installing such tubing in a well, such as a geothermal or oil well.

There is requirement to provide excellent thermal insulation properties in a tubular pipe string where it is required to bring warm or hot liquids to the surface from a deep depth. In other words, it is required to keep the liquid cooling on its traverse from the bottom of the well to the top of the well to a minimum, even though the temperature of the surrounding formations may drop by an average of 3° C. per 100 meters. Such applications are as follows:

1. Geothermal wells which produce hot water from deep aquifers at rather low flow rates where the thermal water would otherwise cool a considerable amount on the traverse to the surface, thereby losing thermal energy available to surface consumers.
2. Closed loop geothermal wells where thermal heat exchanger liquid, which is commonly water, is pumped down to the bottom of a well in an annular space formed between a cemented casing string and a tubing string while drawing thermal energy from the surrounding formations and subsequently transporting the thermal energy to the surface through the tubing string.
3. Oil wells producing crude oil with a high bitumen or paraffin content. Without an efficient thermal insulation, the oil in the tubing string cools considerably as the oil flows towards the surface installation. Once the temperature drops below a level which is specific to the type of oil, bitumen or paraffin starts to change to the solid state and adhere to the internal wall of the tubing string. As a result, flow resistance increases due to the decreased cross-section of the tubing so that sucker rods may become stuck and break. To pump cool and, therefore, highly viscous oil through the pipeline sections close to the well head requires an unnecessary high amount of energy.
4. To produce oil that is already highly viscous in the downhole oil bearing formation where hot steam is pressed into the formation around the well bore to heat up the viscous oil and, thus, improve its flow behaviour. Heat losses on the way to the surface are required to be low so as not to cause any unnecessary flow pressure drop in the production tubing string.

(2) Description of the Related Art

Pipe strings that are covered with glass or stone wool and then wrapped with foils or strips of thin steel sheets to shield the insulating layer against water are frequently used for surface applications. However, water may enter the insulating material through small holes or cracks that may occur in the surrounding cover and reduce the insulating properties of such a string. Therefore, this known method cannot be used to thermally insulate production tubing strings exposed to high pressure liquids in the annular space between the tubing string and a deep wells' casing.

Pipe made from fibreglass has a lower thermal conductivity than steel and is usually used for pipelines or tubing strings for corrosive media rather than for the purpose of thermal insulation because the thermal properties are usually insufficient. Temperature limits and lower strengths further reduce the possible range of applications of pipe made from such material. Fibreglass material is also considerably more expensive than steel pipe of the same diameter and cannot be used in oil wells equipped with reciprocating sucker rods. Also, inventory costs would rise if fibreglass tubing has to be kept in stock in addition to the standard steel tubing that is generally used in oil field operations.

Hitherto, thermally insulated injection and production tubing strings have sometimes been used to complete steam injection wells to obtain increased thermal efficiency of the system. The strings, which often have a length exceeding 1,000 meters, are constructed from individual lengths of double wall pipe, each of which usually has a length of about 9 meters—that is equivalent to range 2 API tubing joints—to be run and retrieved by oil field rigs in the same way as single wall strings.

The most common version of such a string is shown in the Composite Catalogue of Oil Field Equipment, Volume 1, page 988H, 35th revision, 1982–83, published by Gulf Publishing in the U.S.A. The prior art tubing string will now be described with reference to FIGS. 1 and 2 of the accompanying drawings in which FIG. 1 shows a longitudinal cross-section of a tubing string and FIG. 2 shows an enlarged, detailed, longitudinal cross-sectional view of a part of the string shown in FIG. 1 to more clearly show the connection between two lengths of tubing.

Figure 1:
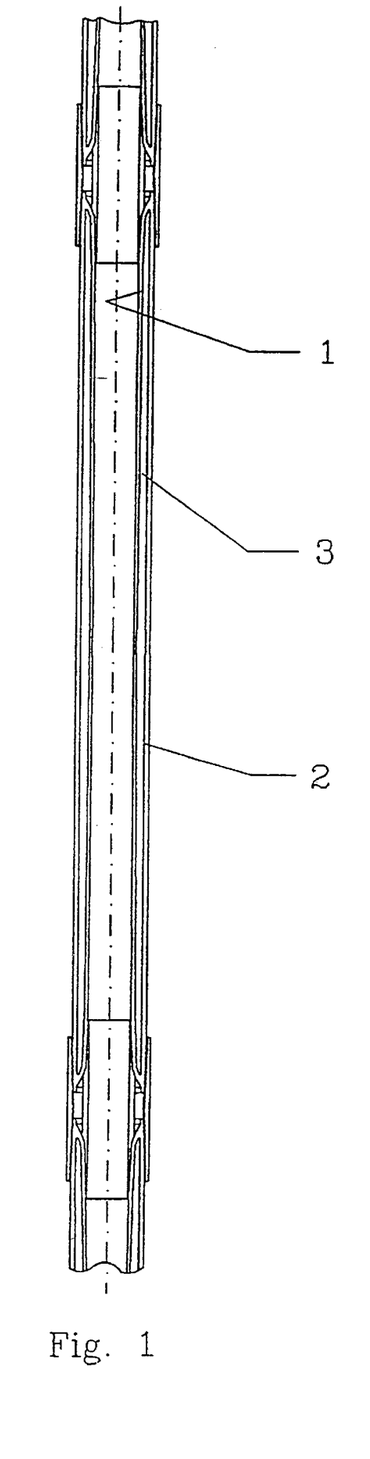
FIG. 1 shows a longitudinal axial cross-section of insulated double wall tubing known in the art.

The thermally insulated tubing shown in FIG. 1 depicts one individual length of thermally insulated tubing having connections at opposing ends thereof, but it is to be realised that in practice there would be a plurality of such tubes lengths used to form a thermally insulated tubing string. FIG. 2 shows constructional details of the threaded connections used to form a length of insulated tubing connected one to the other.

Figure 2:
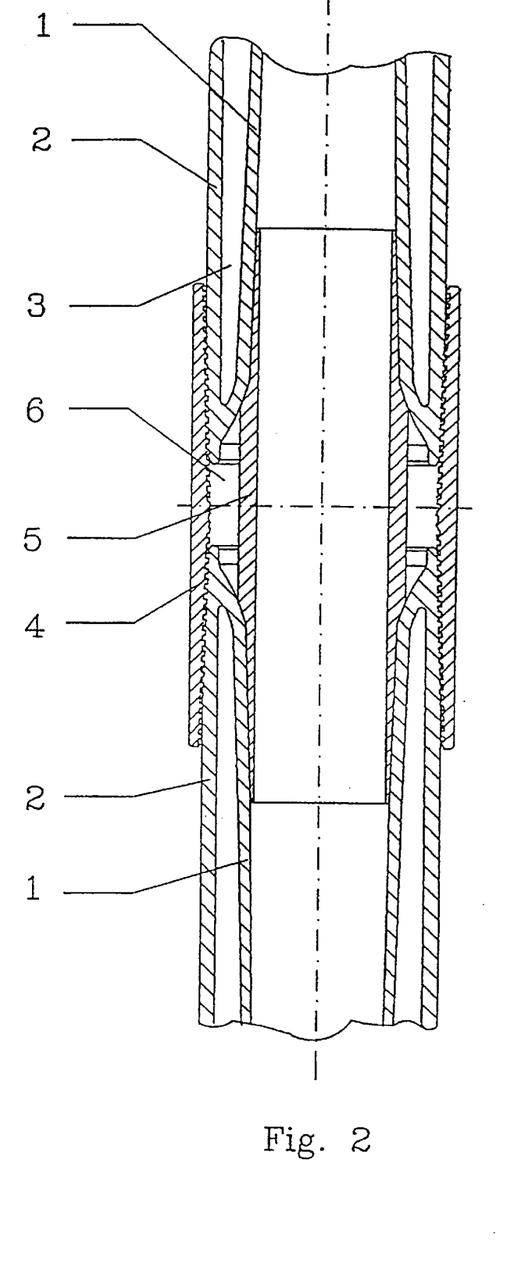
FIG. 2 shows a detail of a joint used in the known art of FIG. 1.

In FIGS. 1 and 2, an internal tube 1 has the internal diameter thereof increased at opposing ends and the internal tube 1 is positioned concentrically inside an external tube and the opposing ends of the internal tube are welded to the external tube 2. Located in the annular space 3 formed between the external wall of the internal tube and the internal wall of the external tube is an insulation medium such as air. The external tube 2 is slightly longer than the insulated double wall section so that connecting screw threads can be cut at opposing ends of the external tube. Double box couplings 4 are used to link one length of dual insulated tubing to the next dual tube in an axial direction. So as to avoid internal diameter changes at each joint connection in the string, which would undesirably increase dynamic pressure losses in the flow of fluid, e.g. oil, non-insulated section sleeves 5 are inserted at the tube ends at the time of running the string into the well.

Mechanically, such strings fulfil all the strength requirements for deep wells. However, even in the ideal case where liquid from the well bore does not enter into the annular space 6 between the sleeve 5 and the box coupling 4, a considerable amount of thermal energy is lost through the thermally conducting bridges created by the internal and external tubes being welded together and also by there being a mechanical connection between the sleeve 5 and the box coupling 4. However, water or oil will usually enter the annular space 6 to further reduce the efficiency of the insulation. Any mechanical damage to the internal tube 1 caused by reciprocating sucker rods or by corrosion will permit liquid to flow into the annular space 7 between inner and outer tubes, thereby causing a thermal bridge that will not immediately become visible at the surface since the annular space is closed off at the end of each internal tube by the internal tube being welded to the external tube.

Another short coming of this type of insulated string is the requirement to weld the internal and external tubes together.

In the drilling industry, it is usual to avoid, wherever possible, welding tools or equipment that is positioned downhole because such welds are the starting points for corrosive leaks. Thus, in the present thermal insulated tubing string example, welding between the internal and external tubes may well be the starting point for a corrosive leak. If corrosion starts from inside the annular space 3 between the two tubes, it will neither be detected visually nor by non-destructive inspection methods commonly used in the oil and gas industry.

When steel tubes leave the production line of a factory they normally have wide length tolerances. So as to match internal and external tubes of dual wall tubing, tubes have to be cut to matching length, thus increasing material cost. The main reason why dual wall tubing strings are not more frequently used is the high cost of purchase, being a multiple of the cost of plain tubes, as well as the increased delivery times for the especially manufactured welded joints and, lastly, but not least, increased inventory levels.

Another dual wall pipe designed for thermal insulating purposes is disclosed in EP-A-0138603. This reference overcomes the difficulty of the above-mentioned prior art by providing a passageway between the connection of two connected lengths of tubing so that the annular space in the respective lengths of tubing are connected together. Thus, in EP-A-0138603 the ends of the internal and external tubes are connected together by a wall and a small passage having a smaller cross-sectional area than the cross-sectional area of the annular space extends longitudinally axially from the annular space outwardly of the conjunction of the internal and external tubes. Because the location of the passage in each tube may not exactly align with one another, so the longitudinally axially outermost portion of the passage is enlarged in cross-sectional area so as to ensure that when two lengths of dual walled pipes are connected together, their respective passages will be interconnected. At an internal and external side of the passage where the two lengths of tubing are connected together there is provided respective annular seals to create a pressure seal between the annular space inside the insulated tubing string and both the liquid inside and around the insulated string.

The annular space may be filled with any desirable insulated gas or liquid and may, alternatively, be evacuated from the surface. Thus, the interconnected annular space can be used to check for leaks in any of the seals or in the walls of the tubing. If the annular space is initially filled with gas, a leak is indicated by an increase in pressure which will rise until the pressure in the annular space balances the pressure of the liquid, either inside the insulated string or outside of it. Once again, this reference has the disadvantage of the above-described insulated dual wall tubing and if either the internal or external tubing should have a leak, the leaking substance will extend throughout the annular space of the whole string. In such an event, it is difficult to locate the position of the leak which may be in elastomer seals radially inward and outward from the passage.

Another known dual wall pipe for reverse circulation drilling is disclosed in GB-A-1204026. In this reference, two concentric tubes are connected to one another by fins that are welded in the annular space between the internal and external tubes. The internal tube is recessed into each end of the external tube and the external tube is provided with a screw thread for connecting individual lengths of tube together. When a string is run into a well, a bridging sleeve having seals at opposing ends thereof is inserted over the internal tube of the upper and lower string section to seal the internal tubes of two different dual wall sections together. Thus, the sleeve extends into the next tubing joint where it is sealed against the internal tube of the next section. The requirement for sleeves connecting the internal tubes to one another adds to the cost of purchasing, storing and maintaining the string. However, a dual wall tubing constructed in accordance with this reference also has the disadvantages mentioned above in that the internal and external tubes are mechanically connected together, thereby creating a thermal connection between the inner and outer tubes.

A thermally insulated pipeline for transporting liquids and gas over the Earth's surface is disclosed in WO91/19129. This reference discloses two concentric steel tubes spaced by an annular space and in the annular space is an insulating material formed of micro-glass fibres or micro-mineral fibres having a compressive strength sufficient to keep the inner tube suitably spaced from the outer tube. The insulating material in the annular space is required to carry the weight of the internal string, since the tubular strings are approximately horizontal, without the insulating material losing its insulating properties. So as to have the appropriate insulating properties, solid insulators are referred to which are extremely porous. These support insulators add to the cost of the tubing string but, even worse, liquids which may pass into the annular space through a leak in one of the internal or external tubular strings will enter the pores of the insulating material of the insulators so that the material has to be replaced.

There is no disclosure in this reference of running such a string of generally independent concentric tubular members designed for more or less horizontal pipelines into a liquid filled, generally vertical, borehole or well and where the annular space between the internal and external tubes would have to be sealed against the influx of liquids contained in the well.

Oil field equipment is not designed to simultaneously run or pull concentric strings of pipe with differing diameters. Oil field tubing joints, according to the worldwide accepted API standard, do not have uniform lengths and joint lengths fluctuate considerably. Only with non-standard, more expensive tubes machined to identical lengths, can concentric strings of pipe be run simultaneously in a slow operation. Although above the surface pipelines are usually welded because at any time access can be obtained from the surface at any point along the line, in distinction, downhole tubing strings are usually threaded since, otherwise, the string has to be cut into slices every time it has to be pulled from the well for any reason.

SUMMARY OF THE INVENTION

It is an object of this invention to substantially mitigate the difficulties of the above-mentioned prior art.

According to a first aspect of this invention there is provided a double walled insulated tubing string adapted to be hung from a support means, said string comprising inner and outer tubes with a thermally insulating gap between said inner and outer tubes, characterised in that said tubing string comprises plural lengths of outer tubes mechanically connected together to form an outer tubing string and plural lengths of inner tubes mechanically joined together to form an inner tubing string, said inner and outer tubing strings being discrete and separate from one another over substantially the whole lengths thereof.

In general, the inner and outer tubing strings are separated from one another without any mechanical connection therebetween except at one or both extreme ends thereof.

In a currently preferred embodiment a removable sealing means is provided at the lower end of the outer tubing string to prevent liquid ingress into the inner tubing string.

Advantageously, the insulating gap is filled with a gas or liquid medium or said gap is substantially evacuated.

Advantageously, the inner and outer tubing strings are mechanically connected together at the upper end of the tubing string or at both extreme ends of the tubing string, that is the top and bottom ends of the insulated tubing string only.

Advantageously, the outer and inner tubes are adapted to withstand a pressure exceeding a hydro-static head of fluid in or outside the insulated tubing string.

In one preferred embodiment, the inner tube string is pre-tensioned and the outer tube string is pre-compressed so as not to exceed predetermined permissible stress levels in the inner and outer tube strings respectively caused by internal and external temperature variations. Advantageously, the inner tube string and/or the outer string is provided with axial length temperature compensating means.

In another preferred embodiment, an insulating spacing means is provided in said insulating gap for maintaining concentricity between the inner and outer tubing strings so as to avoid the inner tube string contacting the outer tube string.

According to a second aspect of this invention there is provided a method of installing a double walled insulating tubing string including the steps of:

providing a first length of outer tube with sealing means at a lower, in use, end thereof for preventing liquid ingress into said outer tube, mechanically connecting a second length of outer tube to the end of said first outer length remote from said sealing means to form an outer tubing string, suspending said outer tubing string from support means, locating first and second connected lengths of inner tube forming an inner tubing string inside said outer tubing string, said first and second inner lengths of tube being mechanically connected together, and said inner tubing string being spaced from said outer tubing string to provide a thermal insulation gap between the inner and outer tubing strings, said inner and outer tubing strings being discrete and separate from one another over substantially the whole lengths thereof.

Preferably, more than two lengths of outer tube and inner tube are connected, respectively, together.

In a preferred embodiment, said sealing means is removed by increasing the fluid pressure within the inner tube lengths or by mechanical means.

Advantageously, to equalise the hydro-static pressure against the outside of said sealing means in a well bore, the internal tube string is filled with a liquid and said sealing means is subsequently de-activated, for example pumped open.

Advantageously, the inner and outer tubes are mechanically connected together at the upper end of the string or at the extreme ends of the string, that is at the top and bottom ends of the insulated string only.

Advantageously, the connection between respective outer tubes and between respective inner tubes is a leak-proof connection, preferably provided by a screw-threaded connection or by welding.

Advantageously, at the lower end of the string a bottom sub is connected on the outer tubing string and a stinger is connected on the inner tubing string so as to form a seal with the outer tubing string.

Advantageously, a seal is provided for the gap at the top of the string so as to provide a vacuum in said gap.

In a preferred embodiment, where the double walled insulating tubing string is located in a production casing string, the cross-sectional area between said double walled insulating tubing string and the production casing string is greater than the cross-sectional area of the inside of the inner tube.

Advantageously, axial length temperature compensating means are included in either the inner and/or outer tubing string.

An advantage of this invention is that the temperature at the gap at the lower end of the string is approximately equal to the temperature at the lower end of the inner tubing string when in use.

The present invention provides an insulated tubing string having minimum heat loss and which uses normal oil field tubing joints with positive seal connections without introducing a third, generally tubular, insulating layer of solid material in the gap between the inner and outer tubes, as is required in WO91/19129. If liquid should enter the insulating gap between inner and outer tubes, it is easy to monitor when a leak occurs so as to locate and replace the leaking element. No welding is necessary in the string, although such may be provided if desired. Once pulled out of the well, tubing joints are easy to clean and to inspect so that they can be re-used in the same well or for any other purpose requiring a tubing string made up from tubing joints of the grade of steel used with positively sealing connections.

BRIEF DESCRIPTION OF THE DRAWINGS

The invention will now be described, by way of example, with reference to the accompanying drawings in which.

In the Figures like reference numerals denote like parts.

DESCRIPTION OF THE PREFERRED EMBODIMENTS

Figure 3:
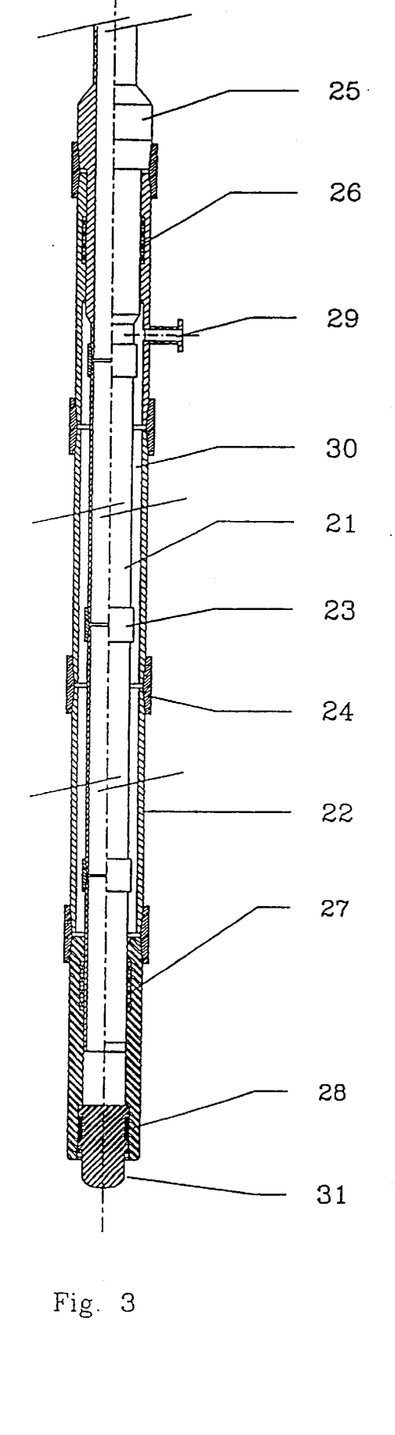
FIG. 3 shows a longitudinal axial cross-section of a first embodiment of a double walled insulated tubing string in accordance with this invention.

FIG. 3 shows a longitudinal cross-section of a double walled insulated tubing string in which there is provided an inner string 21 formed of plural lengths of inner tube (pipe) joined one to another in the axial direction and an outer string 22 formed of individual lengths of outer tube (pipe) which are axially joined together, the inner string 21 being, preferably, concentrically located inside the outer string 22. The inner tube string individual tubes are connected together by threaded connections 23 and the individual tubes of the outer tube string are connected together by threaded connections 24 and both these threaded connections 23, 24 are, typically, premium type connections which are gas and liquid leak-proof.

At the upper end of the double walled insulated tubing string, the inner and outer strings are secured against relative axial movement with regard one another by a member 25 locking the upper end of the two tube strings together. Also at the upper end of the strings is a peripheral seal 26 which seals the inner and outer tube strings together at the extreme upper end of the strings. The axial motion prevention member 25 and the seal 26 may be combined in a single construction element. At the lower end of the tubing strings, the inner and outer tube strings are also sealed together by a peripheral seal 27 to close off and hermetically seal a gap 30 between the inner and outer tube strings. The gap 30 which is, typically, an annular gap since the tube strings are usually circular in cross-section, may be filled with any desired insulating liquid or gas via a valve 29 at the upper end of the outer string 22. Alternatively, the annular gap may be substantially evacuated.

A temporary sealing plug 31 is located in the lower end of the outer string to close off the lower end of the outer string 22 and is sealed to the lower outer tube by a peripheral seal 28. The use of the temporary sealing plug 31 will be described later herein.

Figure 4:
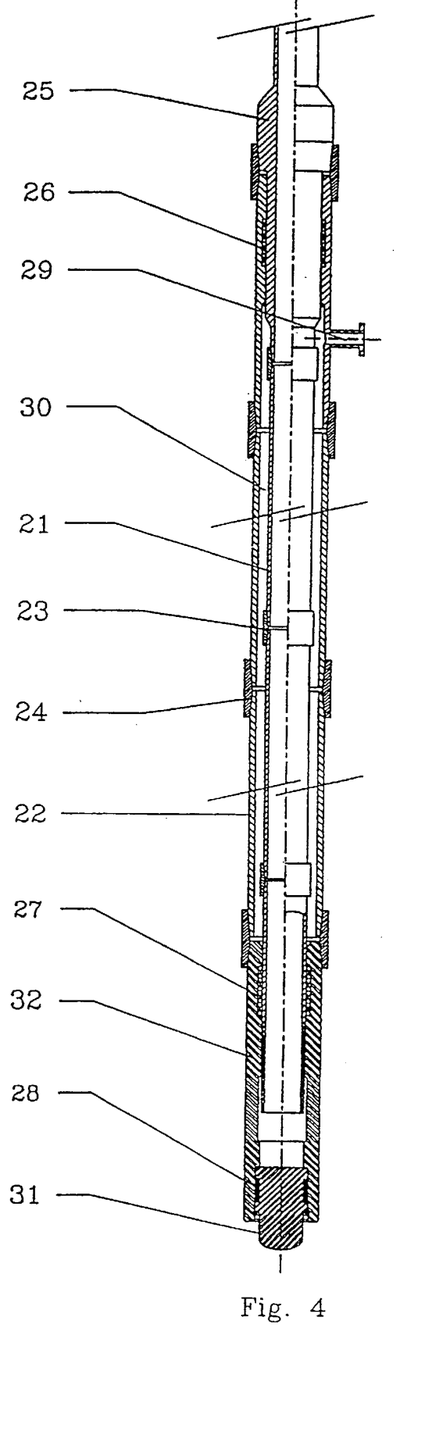
FIG. 4 shows a longitudinal axial cross-section of a second embodiment of a double walled insulated tubing string in accordance with this invention.

A further embodiment of the invention shown in FIG. 4 which is similar to the embodiment of FIG. 3, except that to avoid excessive relative movement in the lower seals 27, 28 caused by frequent temperature fluctuations or caused by friction between the inner string and sucker rods, both independent inner and outer strings are also axially locked against one another by locking member 32 positioned between the seals 27 and 28.

Thus, in general, in this invention the inner and outer tubing strings 21, 22 are discrete and separate from one another without any mechanical connection therebetween over substantially the whole lengths thereof except at one or both extreme ends thereof.

Figure 5A:
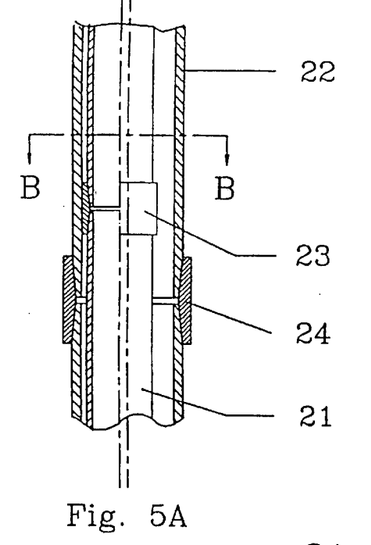
FIG. 5(a) shows a partial longitudinal cross-section of a tubing string in accordance with this invention with the inner tube being eccentric with respect to the outer tube.
Figure 5B:
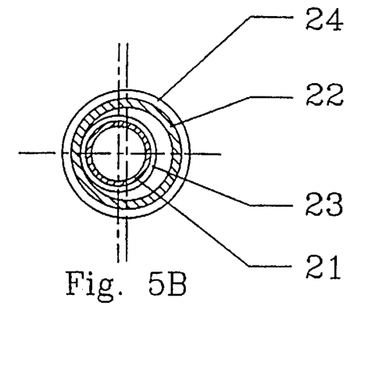
FIG. 5(b) shows a cross-section along double arrow-headed lines B—B of FIG. 5(a)

Because the wells that tubing strings are located in are rarely absolutely vertical or straight, so the longitudinal axis of the inner tubing string 21 may not be concentric with the longitudinal axis of the outer string 22. Depending on whole inclination, as well as changes in azimuth and inclination, both strings may touch, as shown in FIGS. 5(a) and 5(b). The eccentricity is, however, limited by the minimum stand-off caused by the larger outer diameter of the threaded coupling connection 23 of the inner tubing string 21 versus the body of the inner tube. This effect may lead to a line contact between inner and outer tubing strings at some of the couplings causing some minor heat losses. Such heat losses, however, are significantly less than those associated with the prior art.

Figure 6A:
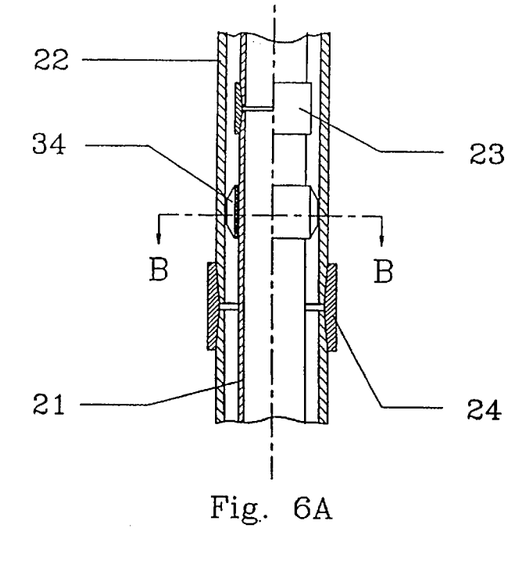
FIG. 6(a) shows a longitudinal cross-sectional view of a portion of a dual double walled insulated tubing string in accordance with this invention being centred by centring elements of low thermal conductivity.
Figure 6B:
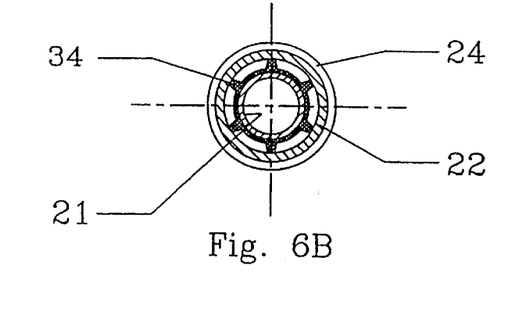
FIG. 6(b) shows a cross-sectional along double arrow-headed lines of B—B of FIG. 6(a)

FIGS. 6(a) and 6(b) show how these minor heat losses may be avoided using a centring device 34 made of material having low thermal conductivity. Such centring devices are located at a minimum of predetermined points along the longitudinal axis and are attached to the outside of the inner tubing string so as to avoid any metallic contact and to minimise contact between the inner and outer tubular strings with the exception of the extreme ends of the thermally insulated dual tubing string.

Figure 7A:
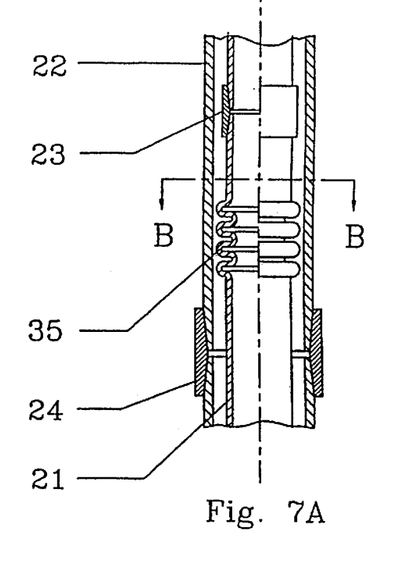
FIG. 7(a) shows a portion of a double walled insulated tubing string in accordance with this invention in which the inner tubing string is provided with thermal expansion elements.
Figure 7B:
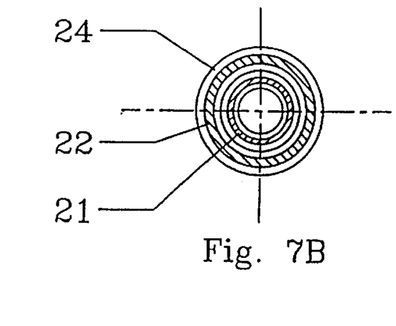
FIG. 7(b) shows a cross-section along double arrow-headed lines B—B of FIG. 7(a)

If both tubing strings are actually locked against each other at their extreme opposite ends, as shown in FIG. 4, temperature fluctuations may lead to undesirably high axial stresses in one or other tubing strings. FIGS. 7(a) and 7(b) show an embodiment of the invention in which an axial length compensator 35 is located in a tube of the inner tubing string 21, although it is to be understood that the compensator may also be used in a tube of the outer tubing string 22, or in both strings.

Figure 8:
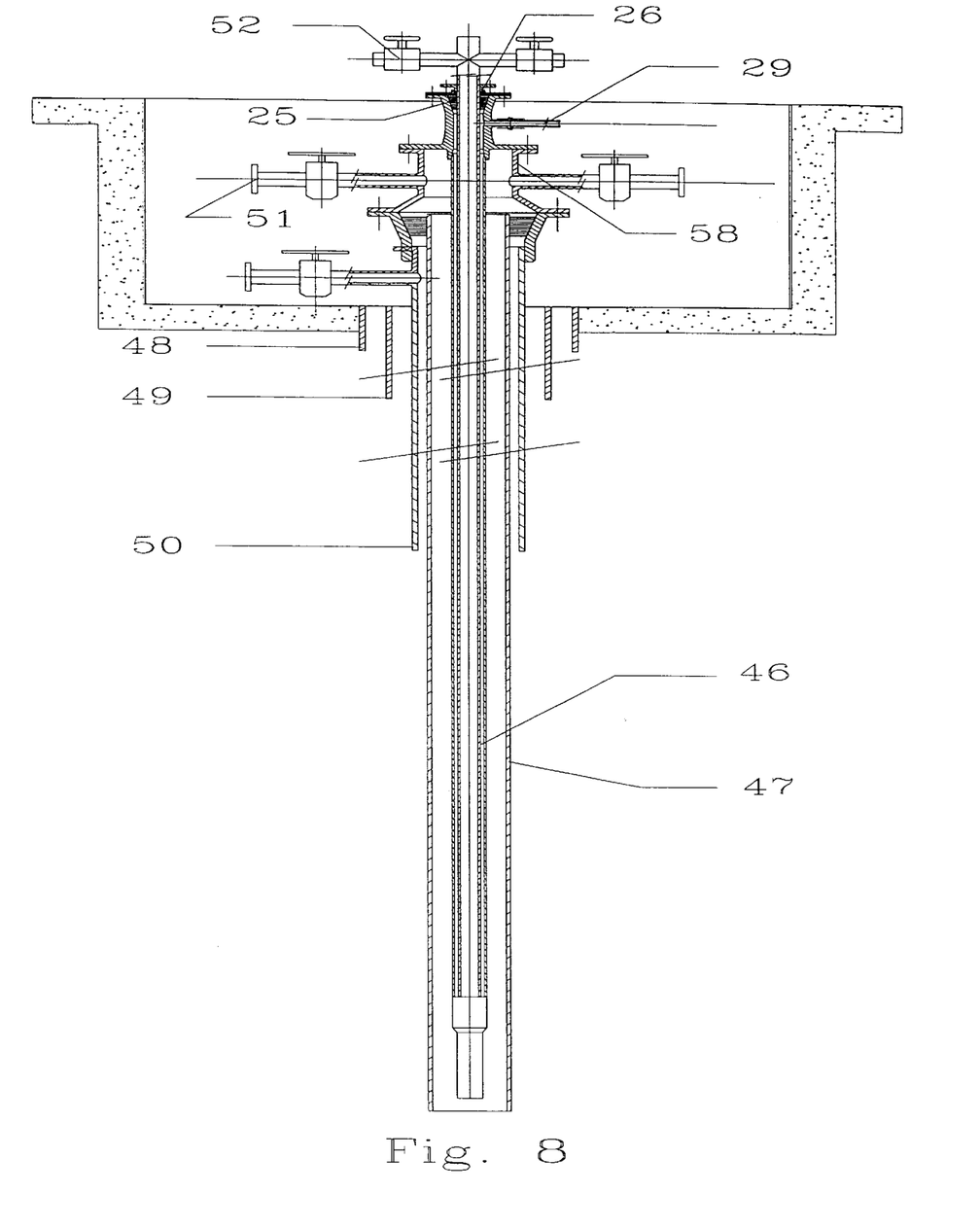
FIG. 8 shows a double walled insulated tubing string in accordance with this invention located in a geothermal well with closed loop heat production.

Referring now to FIG. 8, a double walled insulated tubing string 46 of this invention is installed inside a production casing string 47 of a cemented borehole. Typically, the borehole is provided with a first casing string 48, a radially inner second casing string 49 and yet another, third radially inner casing string 50. Both inner and outer tubing strings of the thermally insulated dual tubing string are supported by the axial motion preventer 25 formed by the well head 58 and, thus, both inner and outer strings 21, 22 are fixed against relative axial movement. In close proximity to the axial motion preventer 25 is the seal 26 closing the annular space between both tubing strings. At the lower end on the thermally insulated tubing string 46 are the seals 27, 28 (not shown in FIG. 8) and the locking member 32 (not separately shown in FIG. 8) which may be provided.

In this embodiment of the invention, a vacuum pump may be connected to the closed annular gap via valve 29 between the two tubing strings to create a vacuum acting as the insulating medium inside the thermally insulated double walled tubing string 46. When withdrawing geothermal energy from the formations surrounding the well, a cold fluid medium such as a liquid, preferably water, is pumped via a valve 51 down the space between the production casing string 47 and the double walled insulating tubing string 46. The temperature of rock formations increases with depth so that the circulating medium becomes warmer as it approaches the lower end of the tubing string 46. The circulating liquid then flows back to the surface through the tubes of the inner tubing string 21 and is removed via valve 52. Preferably, the cross-sectional area of the inner tubing string of the double walled insulated tubing string 46 is much smaller than the flow area between the double walled insulating tubing string and the production casing string 47 so that the period during which the circulating liquid might lose thermal energy while it flows back to the surface is less than the time available to heat the medium up when it moves downwardly through the production casing string 47.

Figure 9:
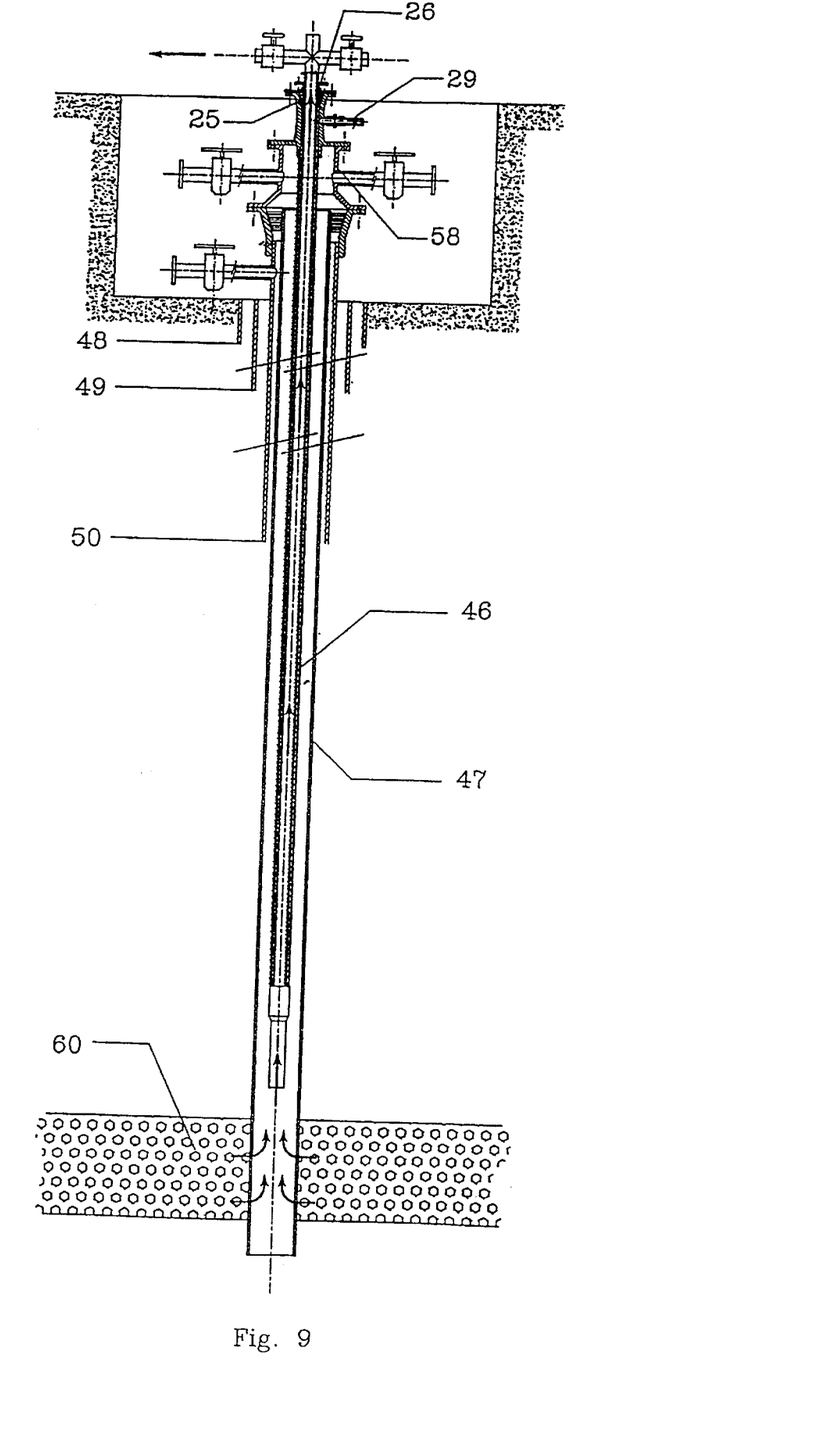
FIG. 9 shows a double walled insulated tubing string in accordance with this invention in an oil or thermal water-producing well.

FIG. 9 shows another embodiment of the present invention using the double walled insulated tubing string for an oil producing well. In distinction to the embodiment of FIG. 8, no cold circulating liquid is pumped down the gap between the insulated tubing string 46 and the production casing string 47 so that the temperature difference between the liquid flowing upwards through the insulated tubing string 46 and the surrounding environment is less severe. The rate of flow of oil producing wells is, however, frequently extremely small so that the overall temperature losses are still considerable if the tubing string is not insulated. Oil, especially with a high content of bitumen or paraffin is extremely temperature sensitive. Once the temperature of the oil or the internal wall of a tubing string falls below a minimum specific for the particular type of oil, bitumen or paraffin partially solidifies so as to block the flow path inside the tubing string or eventually cause the breakage of pump sucker rods. The objective of the thermally insulated dual tubing string of this invention is, therefore, to maintain the temperature of the oil all the way up to the surface well above the critical temperature for solidification. In the embodiment of FIG. 9 the production casing string 47 is shown passing through an oil-containing formation or aquifer 60.

Figure 10:
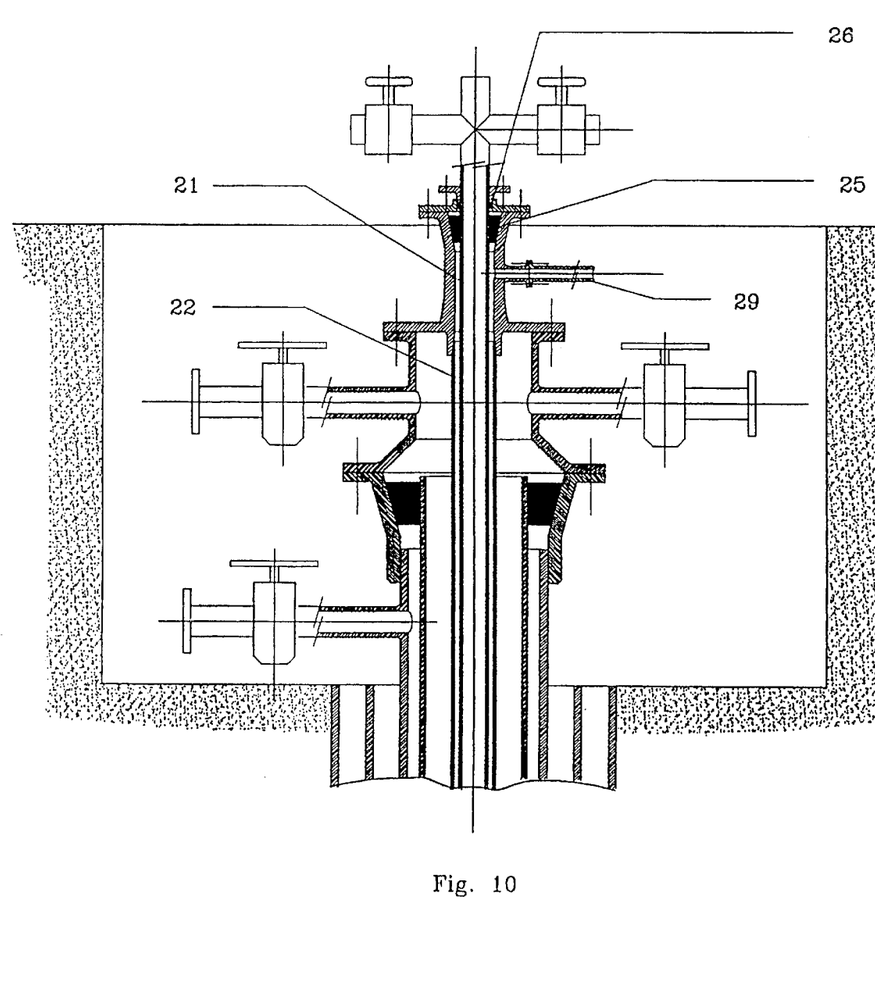
FIG. 10 shows a well head for supporting the inner and outer tube strings and for sealing both strings against one another and also showing provision for attaching a vacuum pump to improve thermal insulation.

FIG. 10 shows an enlarged view of the well head used in the embodiments of FIGS. 8 and 9.

Figure 11:
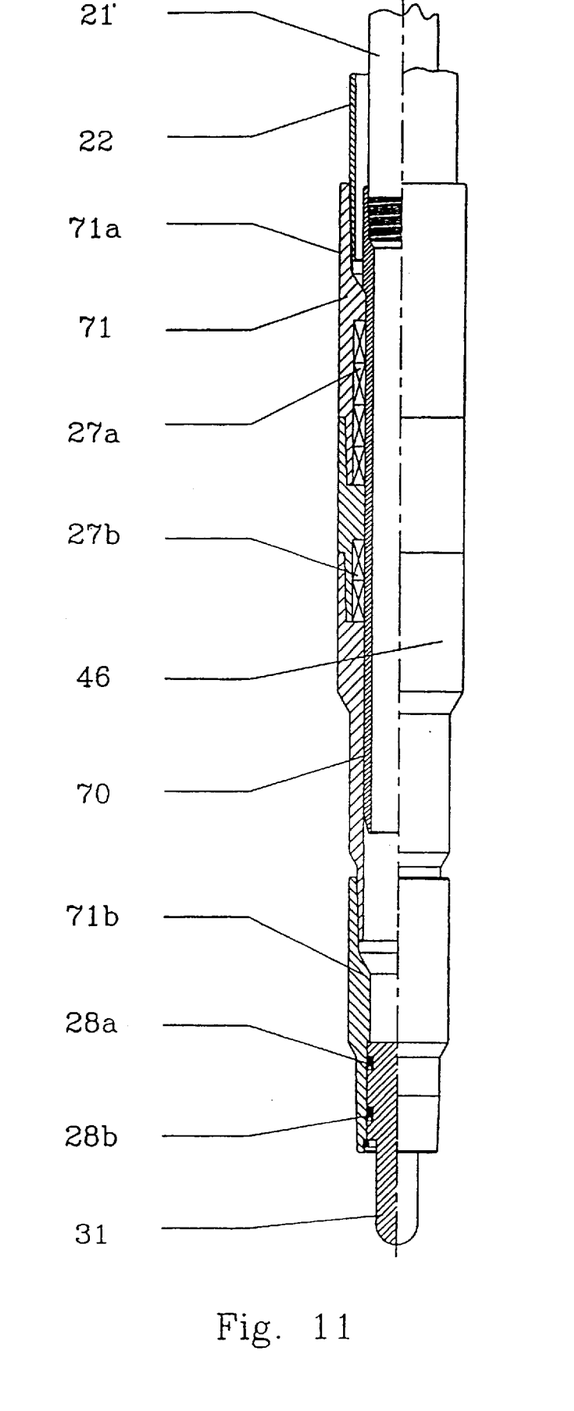
FIG. 11 shows a lower seal between inner and outer strings.

One embodiment of a lower sealing means for the annular space between inner and outer tubing strings, and to plug the outer tubing string is shown in FIG. 11. A polished stinger 70 is threadably connected to the lower end of the inner tubing string 21 to seal against seal elements 27(*a*) and 27(*b*) of seal 27, referred to in FIGS. 3 and 4. A bottom sub 71 is connected to the lower end of the outer tubing string 22 and the seals 27(*a*), 27(*b*) form a liquid and gas-tight seal between the bottom sub 71 and the stinger 70. The bottom sub 71 is formed in two parts 71(*a*), with which the seals 27(*a*), 27(*b*) cooperate, and a lower part 71(*b*) with which seals 28(*a*), 28(*b*) of the seal 28, shown in FIGS. 3 and 4, cooperate. The plug 31 is located in the lower part 71(*b*) of the bottom sub. The plug 21 is inserted and sealed against the bottom sub part 71(*b*) to prevent ingress of liquid into the dual tubing string 46 while the dual tubing string is run into the well. As mentioned above, if found desirable for a particular application, both inner and outer strings may be axially fixed to one another near the seal 28. A device known in the oil industry as a "snap latch" is one manner of effecting such axial fixture.

The method of installing a double walled insulating tubing string will now be described.

Starting with the bottom sub 71 preferably having permanent seals 27(*a*), 27(*b*), 28(*a*), 28(*b*) and temporary plug 31 installed, the outer tubing string 22 is run into the well. The temporary plug 31 prevents liquids contained in the well from entering the inside of the string. The bottom sub is connected by a leak-proof connection to a first outer tube of the outer tubing string and as many other tubes are connected as is necessary until the bottom sub reaches its final position, whereupon the outer tubing string is hung up in slips at the well head 58 (shown in FIGS. 8 and 9).

Commencing with the polished stinger 20, the inner tubing string is now run into the empty outer tubing string until the polished stinger 20 reaches the bottom sub 71 and seals thereagainst by virtue of seals 27(*a*), 27(*b*). To equalise the hydrostatic pressure against the bottom of the temporary plug 31 caused by the liquid in the well bore, the inner tubing string 21 is filled with liquid and the temporary plug 31 is thereafter deactivated, for example by being pumped open. Before or after filling the inner string with liquid and deactivating the temporary plug 31, the inner tubing string is hung up in the well head and sealed off against the outer string at the top of the well. To check if the gap (annular space) between both tubing strings is hermetically sealed, the gap may not be initially evacuated but closed off while a pressure gauge is control the development of the pressure in the gap between both inner and outer strings. If the pressure continues to rise after a small initial increase caused by the initial temperature increase of air between the strings, this is an indication of one or more leaking connections, one or more holes in the tubes and/or a leaking seal at the bottom of the string. In such a case the insulation has to be immediately rectified. As soon as the system is sealed, a vacuum pump is attached to the valve 29 between both tubing strings and the gap is evacuated. Following this procedure the well may be used to produce water or oil or to produce thermal energy as a closed loop geothermal system.

In some circumstances it may be desirable to pretension the dual wall insulated tubing string by pulling on the inner string against the outer string to thereby stretch the inner tubing string and compress the outer tubing string. Such pre-tensioning may be required in severe thermal conditions.

I claim:

1. A double walled insulated tubing string adapted to be hung from support means, said tubing string comprising inner and outer tubes with a thermally insulating gap between said inner and outer tubes, said tubing string comprising plural lengths of outer tubes mechanically connected together by force transferring means to form an outer tubing string and plural lengths of inner tubes mechanically joined together by further force transferring means to form an inner tubing string, said inner and outer tubing strings being discrete and separate from one another over substantially the whole lengths thereof so that said insulating gap is continuous from an upper end of the tubing string to a bottom end of the tubing string, and seal means located at a bottom end of the tubing string sealing between said inner and outer tubing strings thereby closing said insulating gap at said bottom end of the tubing string.

2. A double walled tubing string as claimed in claim 1 wherein a removable sealing means is provided at a lower end of the outer tubing string to prevent liquid ingress into the inner tubing string.

3. A double walled tubing string as claimed in claim 1 wherein the insulating gap is filled with a gas or liquid medium or said gap is substantially evacuated.

4. A double walled tubing string as claimed in claim 1 wherein the inner and outer tubing strings are connected together at both extreme ends of the tubing string, that is a top end and the bottom end of the insulated tubing string only.

5. A double walled tubing string as claimed in claim 1 wherein the inner and outer tubes are adapted to withstand a pressure exceeding a hydro-static head of fluid in or outside the insulated tubing string.

6. A double walled tubing string as claimed in claim 1 wherein the inner tubing string is pre-tensioned and the outer tubing string is pre-compressed so as not to exceed predetermined permissible stress levels in the inner and outer tubing strings respectively caused by internal and external temperature variations.

7. A double walled tubing string as claimed in claim 6 wherein at least one of the inner tubing string and the outer tubing string is provided with axial length temperature compensating means.

8. A double walled tubing string as claimed in claim 1 wherein an insulating spacing means is provided in said insulating gap for maintaining concentricity between the inner and outer tubing strings so as to avoid the inner tubing string contacting the outer tubing string.

9. A method of installing a double walled insulating tubing string including the steps of:

providing a first length of outer tube with sealing means at a lower, in use, end thereof for preventing liquid ingress into said outer tube, mechanically connecting a second length of outer tube to an end of said first outer length remote from said sealing means to form an outer tubing string, suspending said outer tubing string from support means, locating first and second connected lengths of inner tube forming an inner tubing string inside said outer tubing string, said first and second inner lengths of tube being mechanically connected together, and said inner tubing string being spaced from said outer tubing string to provide a thermal insulation gap between the inner and outer tubing strings, said inner and outer tubing strings being discrete and separate from one another over substantially the whole lengths thereof.

10. A method as claimed in claim 9 wherein more than two lengths of outer tube and inner tube are connected, respectively, together.

11. A method as claimed in claim 9 wherein a fluid pressure within the inner tube lengths is increased to remove said sealing means or said sealing means is removed by mechanical means.

12. A method as claimed in claim 11 wherein a hydrostatic pressure against the outside of said sealing means in a well bore is equalised by filling the internal tube string with a liquid and said sealing means is subsequently de-activated.

13. A method as claimed in claim 9 wherein the inner and outer tubes are mechanically connected together at an upper end of the double walled insulating tubing string or at the extreme ends of the double walled insulating tubing string.

14. A method as claimed in claim 9 wherein a connection between respective outer tubes and between respective inner tubes is a leak-proof connection.

15. A method as claimed in claim 9 wherein at a lower end of the double walled insulated tubing string a bottom sub is connected on the outer tubing string and a stinger is connected on the inner tubing string so as to form a seal with the outer tubing string.

16. A method as claimed in claim 9 wherein a seal is provided for the gap at the top of the string so as to provide a vacuum in said gap.

17. A method as claimed in claim 9 wherein where the double walled insulating tubing string is located in a production casing string, the cross-sectional area between said double walled insulating tubing string and the production casing string is greater than the cross-sectional area of the inside of the inner tube.

18. A method as claimed in claim 9 wherein the temperature at the gap at the lower end of the string is approximately equal to the temperature at the lower end of the inner tubing string when in use.

19. A method as claimed in claim 9 wherein axial length temperature compensating means are included in either the inner and/or outer tubing strings.

20. A method of installing a double walled insulating tubing string including the steps of:

providing a first length of outer tube with sealing means (31) at a lower, in use, end thereof for preventing liquid ingress into said outer tube, mechanically connecting a second length of outer tube to the end of said first outer length remote from said sealing means (31) to form an outer tubing string (22), suspending said outer tubing string (22) from support means (58), locating at least one length of inner tube (21) forming an inner tubing string (21) inside said outer tubing string (22), suspending said inner tubing string from support means (58), and said inner tubing string (21) being spaced from said outer tubing string (22) to provide a thermal insulation gap (30) between the inner and outer tubing strings (21, 22), said inner and outer tubing strings being discrete and separate from one another over substantially the whole lengths thereof.

21. A double walled insulated tubing string adapted to be hung from a support means, said tubing string comprising inner and outer tubes with a thermally insulating gap between said inner and outer tubes, said tubing string comprising plural lengths of outer tubes mechanically connected together to form an outer tubing string and plural lengths of inner tubes mechanically joined together to form an inner tubing string, said inner and outer tubing strings being discrete and separate from one another over substantially the whole lengths thereof, and a removable sealing means provided at a lower end of the outer tubing string to prevent liquid ingress into the inner tubing string.

* * * * *